United States Patent
Bergland et al.

Patent Number: 5,533,458
Date of Patent: Jul. 9, 1996

[54] SEED TUBE FOR AN AGRICULTURAL SEEDING MACHINE

[75] Inventors: Norman R. Bergland; Donald R. Wisor, both of Moline; Netza Portillo, Coal Valley, all of Ill.

[73] Assignee: Deere & Company, Moline, Ill.

[21] Appl. No.: 403,999

[22] Filed: Mar. 14, 1995

[51] Int. Cl.$^6$ .................. B65B 57/18; H02K 35/00
[52] U.S. Cl. .................. 111/200; 111/903; 221/211
[58] Field of Search ............... 111/200, 902, 111/903, 905; 221/211; 312 R; 222/566, 567, 575; 250/222.1, 223 R

[56] References Cited

U.S. PATENT DOCUMENTS

| | | | |
|---|---|---|---|
| 3,422,776 | 1/1969 | Gregory, Jr. ............ | 111/903 X |
| 3,537,091 | 10/1970 | Schenkenberg ........... | 111/903 X |
| 3,881,353 | 5/1975 | Fathauser ............... | 111/903 X |
| 3,989,311 | 11/1976 | De brey ................. | 111/903 X |
| 4,009,799 | 1/1977 | Fathauer ................ | 111/903 X |
| 4,149,163 | 4/1979 | Fathauer ................ | 111/903 X |
| 4,163,507 | 8/1979 | Bell .................... | 111/903 X |
| 4,164,669 | 8/1979 | Knepler ................. | 111/903 X |
| 4,555,624 | 11/1985 | Steffen ................. | 250/223 R |
| 4,634,855 | 1/1987 | Friend et al. ........... | 250/222.1 |
| 4,915,258 | 4/1990 | Olson . | |

Primary Examiner—Terry Lee Melius
Assistant Examiner—Robert Pezzuto

[57] ABSTRACT

A hollow seed tube extending between a seed meter and a planting furrow is provided with a sensor aperture for receiving a seed sensor. The interior surface of the seed tube above the sensor aperture is provided with a ramp for directing the seed inwardly away from the sensor.

8 Claims, 2 Drawing Sheets

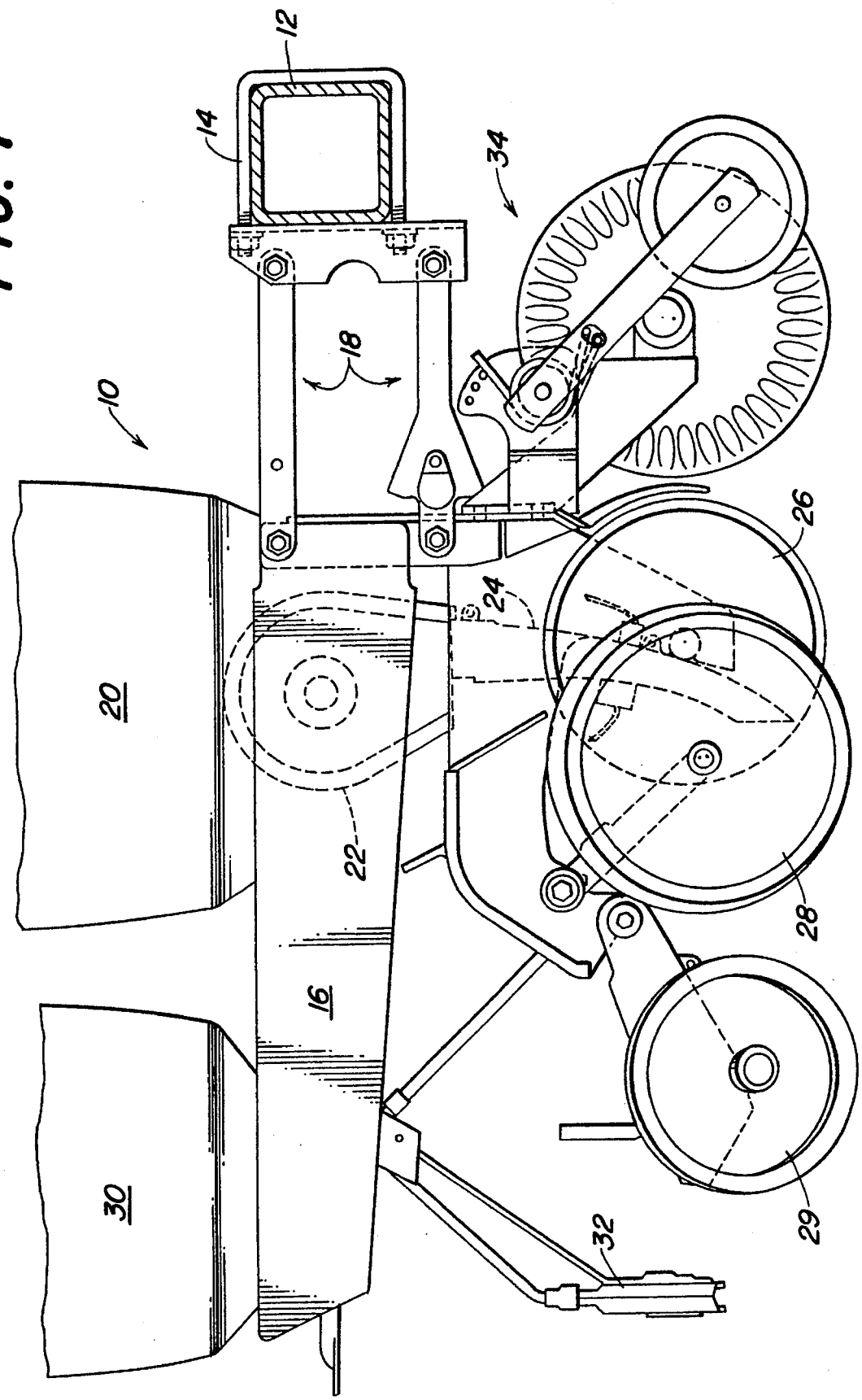

SEED TUBE FOR AN AGRICULTURAL SEEDING MACHINE

BACKGROUND OF THE INVENTION

1. Field of the Invention:

The invention is directed to a seed tube having an internal ramp like structure located immediately above the forward sensor aperture to prevent falling seeds from interfering with the operation of the sensor.

2. Description of the Prior Art:

Agricultural seeding machines are typically provided with a seed meter and a furrow opener between which extends a seed tube. The seed meter measures the amount of seed to be directed to the planting furrow formed by the furrow opener. The seed tube transports the seed from the seed meter to the planting furrow formed by the furrow opener.

A typical seed tube is illustrated in U.S. Pat. No. 4,915,258. The tube illustrated in this patent comprises a forward wall and a rear wall which are joined together by sidewalls forming a hollow tube. The forward and rear walls are curved rearwardly. As the seed is dropped from the seed meter it runs down the inside surface of the forward wall into the planting furrow.

To insure that the planting unit is operating correctly, the seed tube maybe provided with a seed sensor. A typical seed sensor is marketed by Dickey-john Corporation of Auburn, Illinois. The sensor components of the seed sensor are mounted to the front and rear walls of the seed tube. The front wall is provided with a sensor aperture and the rear wall is provided with a second sensor aperture. A light is projected from a light source located in the second sensor aperture of the rear wall across the seed tube to a light receiver located in the sensor aperture of the forward wall. Whenever a seed passes between the light source and the light receiver, the seed interrupts the light beam and the seed is detected.

The light source and light receiver are designed to extend into the apertures and be substantially even with the interior surfaces of the front and rear walls. Sometimes the sensor may extend past the interior surface of the front wall. In this situation the seed hits the top edge of the sensor and where the seed can be damaged. In addition, and its trajectory into the planting furrow would be affected.

SUMMARY

The present invention comprises a seed tube having a sensor aperture in its curved forward wall. The interior surface of the forward wall above the sensor aperture is not in line with the interior surface of the forward wall below the sensor. More specifically, the interior surface of the forward wall above the sensor aperture extends inwardly forming a ramp to prevent seed from coming into contact with the sensor.

Seed is dropped by a seed meter into the tube and runs along the interior surface of the curved forward wall. The interior surface of the forward wall above the sensor aperture directs the seed more inwardly so that it does not contact the top edge of the sensor. Such an arrangement does not significantly affect the trajectory of the seed into the planting furrow.

FIG. 1 is a side view of a planter row unit.

FIG. 2A is a close up cross sectional side view of the sensor aperture.

DETAILED DESCRIPTION

Figure 3:
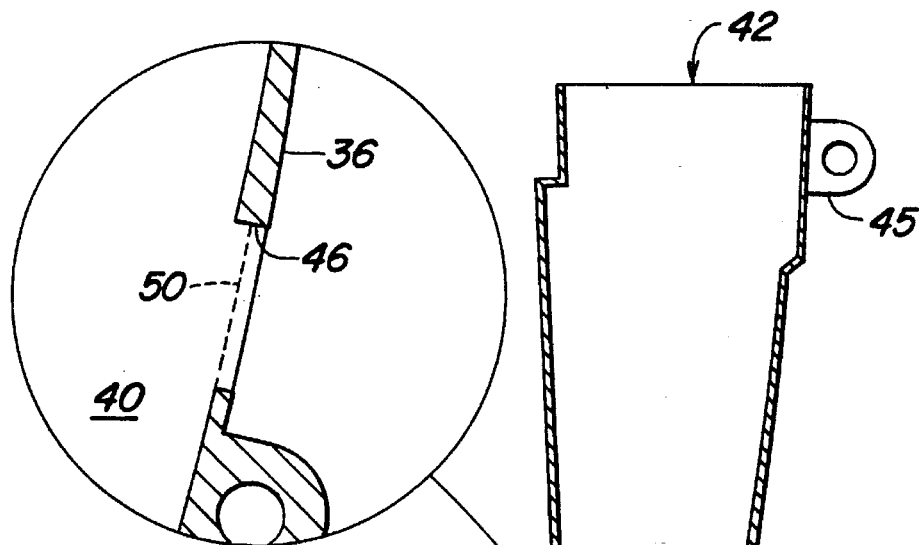
Figure 2:
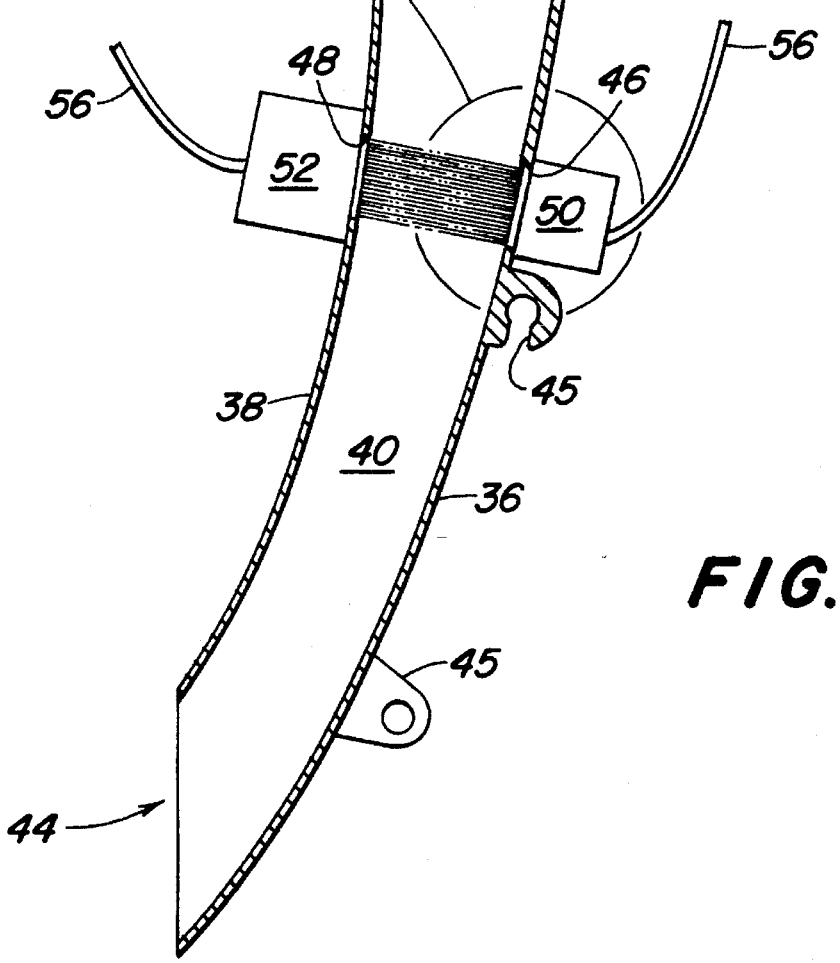
FIG. 2 is a cross sectional side view of the seed tube of the present invention.

FIG. 1 is a side view of a planting unit 10 that is mounted to rectangular toolbar 12 by U-bolts 14. The planting unit 10 is provided with a frame 16 having a parallelogram linkage 18 for coupling the planting unit 10 to the toolbar 12. Seed is stored in seed hopper 20 and directed to seed meter 22. From the seed meter 22 the seed is dropped into seed tube 24 into the planting furrow formed by furrow opener 26. Gauge wheels 28 control the depth of planting and closing wheels 29 close the planting furrow.

Pesticides can be stored in a chemical hopper 30 which is mounted to the planter unit frame 16. A chemical meter, not shown, directs chemicals to an application assembly 32. This particular planting unit is provided with a row cleaner attachment 34.

The seed tube 24 is provided with a curved forward wall 36, a curved rear wall 38 and two sidewalls 40 joining the front and rear walls 36 and 38. The forward and rear walls are curved rearwardly. The tube has an open top 42 and an open bottom 44. The exterior front wall is also provided with tangs 45 for mounting the seed tube to the planting unit frame 16.

The seed tube is provided with two circular sensor apertures, a sensor aperture 46 located on the forward wall and a second sensor aperture 48 located on the rear wall directly opposite the sensor aperture 46. A light receiving sensor 50 is mounted in the sensor aperture 46 and a light source 52 is mounted in the second sensor aperture 48. The light source and light receiving sensor are connected to a monitor in the tractor cab by wires 56. The light source and light receiving sensor form a non-invasive sensor which does not disrupt the flow of seed though the seed tube 24.

The forward wall 36 of the seed tube is provided with a curved interior surface 60. The forward wall thickness above the sensor aperture 46 is thicker than the wall thickness below the sensor aperture 46 thereby forming a ramp. The edge of the ramp extends inwardly past the light receiving sensor 50 directing seed slightly away from the sensor.

As illustrated in the present figures, the ramp-like thickened portion above the sensor aperture 46 maybe integrally formed with the seed tube. Another method of providing the ramp like portion is by inserting a ramp into an existing seed tube.

The present invention should not be limited by the above described embodiment, but should be limited solely by the claims that follow.

We claim:

1. A seed tube for an agricultural seeding machine in which seeds are periodically released for deposit on the ground below, the seed tube comprising:

a tube having a front wall and a rear wall which are joined together by two sidewalls, the front wall having an inside surface and an outside surface, the tube having an open top for receiving seed and an open bottom for depositing seed;

the front wall is provided with a sensor aperture for receiving a non-invasive sensor for detecting seeds passing through the tube, the non-invasive sensor does not disrupt seeds as they flow through the tube;

the inner surface of the front wall immediately above the sensor aperture is provided with a ramp for directing seed falling through the tube inwardly away from the sensor aperture.

2. A seed tube as defined by claim 1 wherein the inner surface of the front wall immediately below the sensor aperture is not in line with the inner surface of the front wall immediately above the sensor aperture.

3. A seed tube as defined by claim 2 wherein the front wall of the tube is curved rearwardly.

4. A seed tube as defined by claim 3 wherein the rear wall of the tube is curved rearwardly.

5. A seed tube as defined by claim 4 wherein the rear wall is provided with a second sensor aperture located directly across the tube from the sensor aperture in the forward wall.

6. A seed tube as defined by claim 5 wherein the front wall below the sensor aperture and the rear wall have the same wall thickness.

7. A seed tube as defined by claim 6 wherein the forwardly wall immediately above the sensor aperture has a thicker wall than the forward wall below the sensor aperture.

8. A seed tube as defined by claim 5 wherein the inner surface of the forward wall immediately above the sensor aperture is integrally formed with the seed tube.

* * * * *